United States Patent [19]

Yoshiga et al.

[11] Patent Number: 4,759,972
[45] Date of Patent: Jul. 26, 1988

[54] ALUMINUM LAMINATE SHEET FOR DEEP-DRAWING AND ALUMINUM CASING FOR AN ALUMINUM ELECTROLYTIC CAPACITOR

[75] Inventors: Norio Yoshiga; Masahiro Kawamura, both of Nagahama, Japan

[73] Assignee: Mitsubishi Plastics Industries Limited, Tokyo, Japan

[21] Appl. No.: 15,106

[22] Filed: Feb. 13, 1987

[30] Foreign Application Priority Data

Feb. 26, 1986 [JP] Japan ................................. 61-40685
Jun. 4, 1986 [JP] Japan ............................... 61-129980

[51] Int. Cl.⁴ ...................... B32B 15/08; B32B 27/08; B32B 27/34
[52] U.S. Cl. .................................. 428/215; 428/216; 428/457; 428/458; 428/474.7

[58] Field of Search ............... 428/458, 457, 461, 215, 428/216, 474.7

[56] References Cited

U.S. PATENT DOCUMENTS

| 4,369,222 | 1/1983 | Hedrick et al. | 428/458 X |
| 4,424,254 | 1/1984 | Hedrick et al. | 428/458 X |
| 4,503,285 | 3/1985 | Darms et al. | 428/458 X |
| 4,559,257 | 12/1985 | Nilsson | 428/458 X |

Primary Examiner—Thomas J. Herbert
Attorney, Agent, or Firm—Oblon, Fisher, Spivak, McClelland & Maier

[57] ABSTRACT

An aluminum laminate sheet for deep-drawing, which comprises an aluminum sheet (1) and a synthetic resin film (2) laminated on at least one side of the aluminum sheet, said resin film having a dynamic elastic modulus of from $1.0 \times 10^8$ to $1.5 \times 10^{10}$ dyne/cm² at 20° C. and a solubility parameter of at least 10.0.

9 Claims, 1 Drawing Sheet

ALUMINUM LAMINATE SHEET FOR DEEP-DRAWING AND ALUMINUM CASING FOR AN ALUMINUM ELECTROLYTIC CAPACITOR

The present invention relates to an aluminum laminate sheet for deep-drawing, and an aluminum casing for an aluminum electrolytic capacitor, obtained by deep-drawing the laminate sheet. More particularly, the present invention relates to a laminate sheet for deep-drawing comprising an aluminum sheet and a certain specific synthetic resin film having excellent interlayer adhesion and solvent resistance, whereby failures such as interlayer peeling hardly take place during a secondary processing such as deep-drawing or caulking. More specifically, the present invention relates to an aluminum laminate sheet for deep-drawing, which is useful for a casing for a capacitor element constituting an aluminum electrolytic capacitor.

Aluminum laminates having various synthetic resin films provided on aluminum sheets with an adhesive or the like interposed therebetween, are used in various fields.

Such laminates are subjected to cold drawing into a desired shape depending upon the final purpose, for example, into a shape of a cylindrical container having a bottom. In such a secondary processing of an aluminum laminate, it has been a problem that even if the interlayer adhesive strength before deep-drawing is good, interlayer peeling or rupture is likely to take place since the synthetic resin layer can not follow the malleability of the aluminum sheet because of the cold processing.

When the final use of such a laminate is intended for a casing to accommodate a capacitor element constituting an aluminum electrolytic capacitor, the casing is formed by deep-drawing such as multi-stage drawing, and a lubricant is usually employed for such deep-drawing, whereby it is required to completely remove the lubricant by cleaning after the deep-drawing. As a solvent for such cleaning, a chlorine-type organic solvent having a strong cleaning power such as perchloroethylene or trichloroethylene is employed. Such a chlorine-type organic solvent is likely to damage the organic resin. Therefore, even if the casing is satisfactorily formed by deep-drawing, it is likely that during the cleaning step, the synthetic resin layer will be dissolved, or peeled from the aluminum layer, whereby it is likely to bring about problems not only on the outer appearance but also on the performance as a casing for a capacitor element.

The present invention is based on a discovery of an aluminum laminate whereby the above problems can be solved by using a certain specific synthetic resin.

The present invention provides an aluminum laminate sheet for deep drawing, which comprises an aluminum sheet (1) and a synthetic resin film (2) laminated on at least one side of the aluminum sheet, said resin film having a dynamic elastic modulus of from $1.0 \times 10^8$ to $1.5 \times 10^{10}$ dyne/cm$^2$ at 20° C. and a solubility parameter of at least 10.0.

BRIEF DESCRIPTION OF THE DRAWINGS

In the accompanying drawings.

Figure 1:
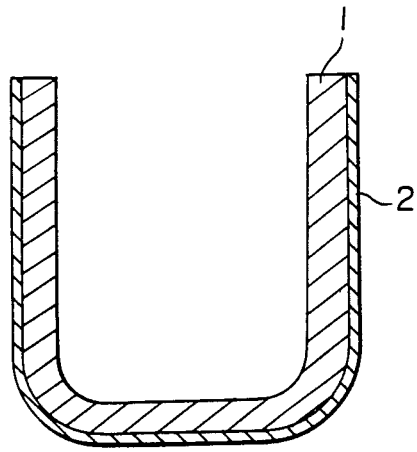
FIG. 1 illustrates a cross-sectional view of an aluminum laminate sheet of the present invention deep-drawn into a casing for an aluminum electrolytic capacitor.

As the aluminum sheet which may be employed in the present invention, a sheet of aluminum having a purity of at least 90% and a thickness of from 0.2 to 0.5 mm is suitable. Further, it is possible to employ the one having its surface treated by chemical treatment with e.g. a phosphate and chromate, or by etching treatment such as electrolytic etching treatment.

In the present invention, the dynamic elastic modulus is the one measured by using a usual viscoelasticity spectrometer by a tensile method at a frequency of 1 Hz and reading the numerical value at 20° C.

If a synthetic resin having a dynamic elastic modulus of less than $1.0 \times 10^8$ dyne/cm$^2$ is used, the resin layer is likely to stretch and peel off when a certain specific shape is punched out after the deep-drawing. On the other hand, if a resin having a dynamic elastic modulus exceeding $1.5 \times 10^{10}$ dyne/cm$^2$ is used, when caulking was applied after the deep-drawing, the resin at the caulking portion tends to peel off or rupture.

The resin having a dynamic elastic modulus within a range of from $1.0 \times 10^8$ to $1.5 \times 10^{10}$ dyne/cm$^2$ may suitably be selected depending upon the properties required for deep-drawing or for e.g. chemical resistance.

Further, for a casing for accommodating a capacitor element constituting an aluminum electrolytic capacitor, it is necessary to employ a synthetic resin which satisfies a requirement for the solubility parameter being at least 10.0 in addition to the requirement for the above-mentioned dynamic elastic modulus.

The solubility parameter (hereinafter sometimes referred to as "SP") in the present invention is represented by a square root of the molecular cohesive energy density (CED) and is specific to the substance. It may be obtained also by calculation in accordance with the following equation wherein a cohesive energy constant is used:

$SP = d \Sigma G / M$, whereby d is a density, G is a cohesive energy constant, M is a standard molecular weight.

If a synthetic resin having a solubility parameter of less than 10.0 is used, the resulting resin film is likely to be damaged by a chlorine-type organic solvent such as perchloroethylene, thus leading to a problem that it is inferior in the solvent resistance.

Various resins may be employed as the resin which satisfies the dynamic elastic modulus and solubility parameter within the above-mentioned ranges. However, a resin selected from the group consisting of a nylon elastomer, a polymer alloy of nylon with a carboxylic acid-grafted polyolefin, a 6,12-nylon copolymer and a urethane elastomer, is preferably employed, since such a resin is excellent also in other properties.

The nylon elastomer is composed of a hard segment such as 6-nylon or 6,6-nylon and a soft segment such as a polyether or a polyester. The polyether may be polyethylene glycol or polypropylene glycol.

The polymer alloy of nylon with a carboxylic acid-grafted polyolefin is obtained by melt-blending a carboxylic acid-modified polyolefin to the main component of a nylon resin such as 6,6-nylon or 6-nylon. The carboxylic acid-grafted polyolefin includes a modified ethylene-propylene-diene copolymer obtained by grafting maleic anhydride to an ethylene-propylene-diene copolymer, and an ionomer resin obtained by ionizing an ethylene-methacrylic acid copolymer with e.g. Na, Zn or Mg.

The 6,12-nylon copolymer is obtained by copolymerizing from 20 to 80% by weight of 6-nylon with from 80 to 20% by weight of 12-nylon.

The urethane elastomer is composed of a hard segment which is composed of an addition polymer of a diisocyanate and a short chain glycol having a molecular weight of not higher than 500 such as ethylene glycol or 1,3-propylene glycol, and a soft segment which is composed of an addition polymer of a diisocyanate and a long chain glycol having a molecular weight of from 500 to 3,000 and terminal active hydrogen atoms. The isocyanate includes 4,4'-diphenyl diisocyanate, tolylene diisocyanate, hexamethylene diisocyanate and 4,4'-dicyclohexylmethane diisocyanate, and four types i.e. a caprolactam type, an adipate type, a polycarbonate type and a polyether type, may be employed depending upon the type of the above-mentioned long chain glycol.

The above resins may be employed alone or in combination as a mixture.

Various methods may be employed for laminating the synthetic resin film to the aluminum sheet. From the viewpoint of the productivity, it is preferred to employ a method wherein a various adhesive is coated and baked onto the aluminum sheet, followed by melt-extruding the synthetic resin film for lamination by an extruder.

The thickness of the laminated synthetic resin film is preferably within a range of from 10 to 1,000 $\mu$m, more preferably from 10 to 100 $\mu$m. If the thickness is less than 10 $\mu$m, when the draw ratio in the deep-drawing is large, the resin film is likely to rupture at the corner portion. On the other hand, if the thickness exceeds 1,000 $\mu$m, the interlayer adhesive strength tends to be poor, and the product will be costly, such being disadvantageous.

When the aluminum laminate sheet having the above-mentioned structure is used for a casing for an aluminum electrolytic capacitor, it is deep-drawn into a bottomed cylindrical casing so that the synthetic resin film 2 constitutes the outer surface layer of the casing (FIG. 1).

The deep-drawing may be conducted by multi-stage drawing by using progressive dies with lancing slits or by ironing.

Figure 2:
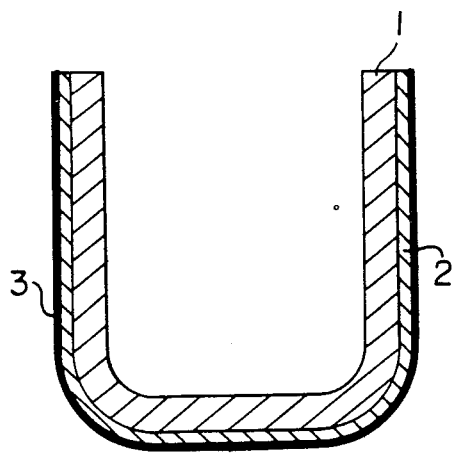
FIG. 2 illustrates another embodiment of the invention wherein a nylon resin layer is laminated as the outermost layer of the casing.

The cleaning efficiency can be improved by introducing a number of casings into a solvent for cleaning, but due to the collision of the casings to one another, scars or scratch marks are likely to form on the surface, whereby there will be problems with respect to the physical properties or the outer appearance. In such a case, it is advisable to coat a nylon resin layer 3 having a Rockwell hardness (R scale) of at least 100 on the film 2 in a thickness ratio of the film 2 to the layer 3 of from 1:1 to 100:1 so that the nylon resin layer 3 constitutes the outermost layer of the casing (FIG. 2).

The resin for the nylon resin layer 3 must be a nylon resin having a Rockwell hardness (R scale) of at least 100. If the hardness is less than 100, such a nylon resin does not provide adequate effects for preventing scars or scratch marks on the surface of the casing. The nylon resin having a hardness of at least 100 includes a 6-nylon resin, a 6,6-nylon resin, a copolymer of 6-nylon and 6,6-nylon, and an aromatic nylon resin composed of m-xylenediamine and adipic acid.

The thickness of the resin film 2 and the thickness of the nylon resin layer 3 having the above composition are required to be within a range of a specific ratio. Namely, the thickness ratio of the layer 2 to the layer 3 is required to be within a range of from 1:1 to 100:1. The total thickness of the layers 2 and 3 is usually from 50 to a few hundred micrometers, and the thickness of the layer 3 is usually within a range of from 1 to 20 $\mu$m, preferably from 1 to 5 $\mu$m. If the layer 3 is too thick with respect to the above thickness ratio, the interlayer peeling during the deep-drawing is likely to result. On the other hand, if the layer 3 is too thin, there will be no adequate effects for preventing scars or scratch marks to the surface of the casing.

Various methods may be employed for coating the resin film 2 and the nylon resin layer 3 on the aluminum sheet 1. However, from the viewpoint of the productivity, it is preferred to employ a method wherein a various adhesive is coated and baked onto the aluminum sheet 1, followed by melt-extruding a resin film 2 and nylon resin layer 3 by an extruder equipped with a double layer dies to form a laminate.

Figure 3:
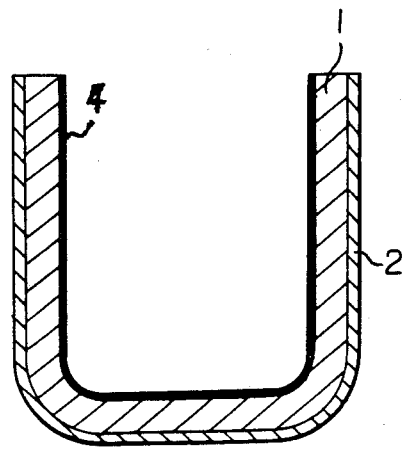
FIG. 3 illustrates a further embodiment of the invention, wherein a nylon resin layer is laminated as the inner layer of the casing.

In recent years, there has been a trend for a small-sized aluminum electrolytic capacitor. When small-sized, the inner surface (the aluminum surface) of the casing is likely to contact the element, thus leading to shortcircuiting. In order to prevent such shortcircuiting, it is necessary to provide an insulating layer on the inner surface of the casing. Such an insulating layer is preferably made of a nylon resin having a solubility parameter of at least 12.5 so that it will not dissolve or swell in the electrolytic solution. Namely, in a preferred embodiment as shown in FIG. 3, the aluminum laminate sheet comprises an aluminum sheet 1, a resin film having a dynamic elastic modulus of from $1.0 \times 10^8$ to $1.5 \times 10^{10}$ dyne/cm$^2$ at 20° C. and a solubility parameter of at least 10.0, laminated on one side of the aluminum sheet, and a nylon resin layer 4 having a solubility parameter of at least 12.5, laminated on the other side of the aluminum sheet, so that the resin film 2 constitutes the outer layer of the casing, and the nylon resin layer 4 constitutes the inner layer of the casing. The nylon resin layer 4 is preferably made of a nylon resin selected from the group consisting of 6-nylon resin, a 6,6-nylon resin, a copolymer resin of 6-nylon with 6,6-nylon, and an aromatic nylon resin made of m-xylenediamine and adipic acid.

If the solubility parameter of the nylon resin layer 4 is less than 12.5, the layer is likely to swell when it is in contact with an electrolyte component such as ethylene glycol, 2-pyrrolidone, $\gamma$-butyrolactone, N,N-dimethylformamide or N-methylformamide for a long period of time.

The thickness of the nylon resin layer 4 is preferably from 1 to 50 $\mu$m, more preferably from 5 to 30 $\mu$m. If the thickness is less than 1 $\mu$m, the layer is likely to rupture at the corner portion when deep-drawn at a large draw ratio. On the other hand, if it exceeds 50 $\mu$m, the caulking processability tends to be inferior.

Now, the present invention will be described with reference to Examples. However, it should be understood that the present invention is by no means restricted to these specific Examples.

EXAMPLE 1

An aluminum sheet (1050-0 material according to JIS H4,000) having a thickness of 0.4 mm was subjected to chemical treatment with a phosphate-chromate treating solution to form a treated surface layer having a thickness of 20 mg/dm². On one side of this chemically treated aluminum sheet, a synthetic resin film having the solubility parameter and dynamic elastic modulus as identified in Table 1 was laminated to obtain each of the following Test Samples.

Test Sample No. 1:

Nylon elastomer

Hard segment: 6-Nylon (65% by weight)
Soft segment: Polyether (polypropylene glycol) (35% by weight)

On one side of the chemically treated aluminum sheet, an epoxy type adhesive was coated in a thickness of 1.4 μm, and then the above identified nylon elastomer was laminated by extrusion at a lamination temperature of 240° C. to obtain an aluminum laminate having a synthetic resin layer of 60 μm.

Test Sample No. 2:

Polymer alloy of nylon with a carboxylic acid-grafted polyolefin

6-Nylon (55% by weight)
Grafted polyolefin (45% by weight): Maleic anhydride is grafted to an ethylene-propylene-diene copolymer.

On one side of the chemically treated aluminum sheet, a film (60 μm) of the above identified polymer alloy having a silane coupling agent coated and dried in a thickness of 0.5 μm, was laminated at 300° C. so that the silane coupling agent-coated side was in contact with the aluminum surface, and then heat-treated at 250° C. for 60 seconds to obtain Test Sample No. 2.

Test Sample No. 3:

A 6,12-nylon copolymer obtained by copolymerizing 66% by weight of 6-nylon with 34% by weight of 12-nylon, was used as the synthetic resin. Other conditions for lamination were the same as in the case of Test Sample No. 1.

Test Sample No. 4:

Urethane elastomer (adipate type)

Hard segment: Addition polymer of ethylene glycol with 4,4'-diisocyanate (60% by weight)
Soft segment: Addition polymer of a glycol adipate with 4,4'-diisocyanate On one side of the chemically treated aluminum sheet, a polyester adhesive was coated in a thickness of 1.4 μm, and then the above identified urethane elastomer was laminated by extrusion at a lamination temperature of 240° C. to obtain an aluminum laminate having a synthetic resin layer of 60 μm.

Test Sample No. 5:

On one side of the chemically treated aluminum sheet, a polyester adhesive was coated in a thickness of 1.4 μm, and then a rigid polyvinyl chloride resin (plasticizer: 6% by weight) was laminated by extrusion at a lamination temperature of 210° C. to obtain an aluminum laminate having the synthetic resin layer of a thickness of 60 μm.

Test Sample No. 6:

On one side of the chemically treated aluminum sheet, a 6-nylon resin film (60 μm) having a silane coupling agent coated and dried in a thickness of 0.5 μm, was laminated at 300° C. so that the silane coupling agent-coated side was in contact with the aluminum surface, and then heat-treated at 250° C. for 60 seconds to obtain Test Sample No. 6.

Test Sample No. 7

On one side of the chemically treated aluminum sheet, a polyester adhesive was coated in a thickness of 1.4 μm, and then a chlorinated polytheylene resin film (chlorination degree: 30% by weight) was dry-laminated at a lamination temperature of 210° C. to obtain an aluminum laminate having the synthetic resin layer of a thickness of 60 μm.

Test Sample No. 8:

On one side of the chemically treated aluminum sheet, a polyester adhesive was coated in a thickness of 1.4 μm, and then a polyethylene terephthalate resin was laminated by extrusion at a lamination temperature of 300° C. to obtain an aluminum laminate having the synthetic resin layer of a thickness of 60 μm.

By using the Test Samples thus obtained, the adhesive strength, the deep-drawing processability, the caulking processability and the solvent resistance were evaluated. The results are shown in Table 1.

The evaluation with respect to such properties was conducted as follows.

Adhesive strength:

A test piece with a width of 20 mm was cut out from each aluminum laminate, and a notch was formed in the aluminum layer. Then, a 180° peeling test was conducted at a peeling speed of 50 mm/min. The case wherein no interlayer peeling was observed even when the load was varied and the resin layer broke, was evaluated to be "O".

Deep-drawing processability:

By using progressive deep-drawing dies with lancing slits, each test sample was subjected to deep-drawing (ironing) in seven stages under an overall draw ratio of 0.32 or an overall ironing ratio of 35% to form a cylindrical casing having a size of 10 mm in diameter and 22 mm in length after being punched out.

The one where no interlayer peeling was observed during the deep-drawing and the punching-out operation, was evaluated to be "O", the one where no interlayer peeling was observed during the deep-drawing, but partial peeling of the resin layer was observed at the time of the punching-out the casing, was evaluated to be "Δ", and the one where interlayer peeling was observed during the deep-drawing was evaluated to be "X".

Here, the overall draw ratio=$D/D_0$ (where D: the diameter of the deep-drawn cylinder, and $D_0$: the diameter of the blank prior to the processing).

The overall ironing ratio=$t_1 - t_2/t_1 \times 100 (\%)$
(where $t_1$ the original wall thickness, and $t_2$: the wall thickness after the ironing).

Caulking processability:

By using a caulking machine, the open edge of the cylindrical casing having a size of 10 mm in diameter and 22 mm in length obtained by deep-drawing, was caulked under a condition such that a caulking device rotates 8 times per 0.5 second along the periphery of the cylindrical casing, to form a caulked portion having the maximum depth of 1 mm along the periphery of the open edge of the cylindrical casing. The one where no peeling of the resin at the caulked portion was observed, was evaluated to be "O", and the one where peeling of the resin at the caulked portion was observed, was evaluated to be "X".

Solvent resistance:

The synthetic resin film used for each test sample, was cut into a test piece having a size of 30×30 mm and a thickness of 0.5 mm. This test piece was immersed in perchloroethylene at a temperature of 80° C. for 10 minutes, whereupon the volume change of the film was measured.

The one where the volume change was less than 50%, was evaluated to be "O", the one where the volume change was within a range of from 50 to 100%, was evaluated to be "Δ", and the one where the volume change exceeds 100% or the test piece was dissolved, was evaluated to be "X".

TABLE 1

|   | Solubility parameter | Dynamic elastic modulus (dyne/cm$^2$) | Adhesive strength | Deep-drawing processability | Caulking processability | Solvent resistance |
|---|---|---|---|---|---|---|
| 1 | 11.0 | $4.8 \times 10^9$ | O | O | O | O |
| 2 | 10.9 | $1.0 \times 10^{10}$ | O | O | O | O |
| 3 | 11.6 | $5.8 \times 10^9$ | O | O | O | O |
| 4 | 10.5 | $5.5 \times 10^8$ | O | O | O | O |
| 5 | 9.5 | $4.0 \times 10^{10}$ | O | Δ | X | X |
| 6 | 12.7 | $2.9 \times 10^{10}$ | O | O | X | O |
| 7 | 8.7 | $2.7 \times 10^8$ | O | O | O | X |
| 8 | 10.7 | $3.0 \times 10^{10}$ | O | X | X | O |

It is evident from Table 1 that Test Sample Nos. 1 to 4 wherein synthetic resin films having a dynamic elastic modulus and a solubility parameter within the ranges of the present invention, are excellent in all of the adhesive strength, the deep-drawing processability, the caulking processability and the solvent resistance.

Whereas, Test Sample No. 5 wherein the dynamic elastic modulus is too high and the solubility parameter is too low, is inferior in the deep-drawing processability, the caulking processability and the solvent resistance, although it has excellent adhesive strength. Likewise, Test Sample No. 6 wherein the dynamic elastic modulus is too large although the solubility parameter is within the range of the present invention, is inferior in the caulking processability. Test Sample No. 7 wherein the solubility parameter is low while the dynamic elastic modulus is within the range of the present invention, is inferior in the solvent resistance. Test Sample No. 8 having a high dynamic elastic modulus like Test Sample No. 5, is inferior in the deep-drawing processability and the caulking processability.

As described in the foregoing, the aluminum laminate sheet of the present invention has excellent deep-drawing processability and caulking processability, and thus is useful for containers obtained by deep-drawing, in various fields.

Further, it is particularly useful in the field of electronic parts, especially as a casing for an aluminum electrolytic capacitor which is subjected to cleaning with a chlorine-type organic solvent.

We claim:

1. An aluminum laminate sheet for deep-drawing, which comprises an aluminum sheet having a thickness of from 0.2 to 0.5 mm (1) and a synthetic resin film having a thickness of from 10 to 100 μm (2) laminated on at least one side of the aluminum sheet, said resin film having a dynamic elastic modulus of from $1.0 \times 10^8$ to $1.5 \times 10^{10}$ dyne/cm$^2$ at 20° C. and a solubility parameter of at least 10.0.

2. The aluminum laminate sheet according to claim 1, wherein the synthetic resin film (2) is a film of a resin selected from the group consisting of a nylon elastomer, a polymer alloy of nylon with a carboxylic acid-grafted polyolefin, a 6,12-nylon copolymer and a urethane elastomer.

3. The aluminum laminate sheet according to claim 1, wherein a nylon resin layer (3) having a Rockwell hardness (R scale) of at least 100 is coated on the film (2) in a thickness ratio of the film (2) to the layer (3) of from 1:1 to 100:1.

4. The aluminum laminate sheet according to claim 1, which comprises an aluminum sheet having a thickness of from 0.2 to 0.5 mm (1), a resin film having a thickness of from 10 to 100 μm (2) having a dynamic elastic modulus of from $1.0 \times 10^8$ to $1.5 \times 10^{10}$ dyne/cm$^2$ at 20° C. and a solubility parameter of at least 10.0, laminated on one side of the aluminum sheet, and a nylon resin layer (4) having a solubility parameter of at least 12.5, laminated on the other side of the aluminum sheet.

5. The aluminum laminate sheet according to claim 3, wherein the nylon resin layer (3) is made of a nylon resin selected from the group consisting of a 6-nylon resin, a 6,6-nylon resin, a copolymer resin of 6-nylon with 6,6-nylon, and an aromatic nylon resin made of m-xylenediamine and adipic acid.

6. The aluminum laminate sheet according to claim 4, wherein the nylon resin layer (4) is made of a nylon resin selected from the group consisting of a 6-nylon resin, a 6,6-nylon resin, a copolymer resin of 6-nylon with 6,6-nylon, and an aromatic nylon resin made of m-xylenediamine and adipic acid.

7. An aluminum casing for an aluminum electrolytic capacitor, obtained by deep-drawing the aluminum laminate sheet as defined in claim 1 into a casing so that the synthetic resin film (2) constitutes the outer surface layer of the casing.

8. An aluminum casing for an aluminum electrolytic capacitor, obtained by deep-drawing the aluminum laminate sheet as defined in claim 3 into a casing so that the nylon resin layer (3) constitutes the outermost layer of the casing.

9. An aluminum casing for an aluminum electrolytic capacitor, obtained by deep-drawing the aluminum laminate sheet as defined in claim 4 into a casing so that the resin film (2) constitutes the outer layer of the casing, and the nylon resin layer (4) constitutes the inner layer of the casing.

* * * * *